United States Patent
Pientka

[11] Patent Number: 5,811,793
[45] Date of Patent: Sep. 22, 1998

[54] RAIN SENSOR FOR GLASS SHUT

[75] Inventor: Rainer Pientka, Achern, Germany

[73] Assignee: Robert Bosch GmbH, Stuttgart, Germany

[21] Appl. No.: 682,648

[22] PCT Filed: Feb. 3, 1995

[86] PCT No.: PCT/DE95/00144

§ 371 Date: Aug. 15, 1996

§ 102(e) Date: Aug. 15, 1996

[87] PCT Pub. No.: WO95/23082

PCT Pub. Date: Aug. 31, 1995

[30] Foreign Application Priority Data

Feb. 26, 1994 [DE] Germany .......... 44 06 398.9

[51] Int. Cl.[6] .................................................. H01J 5/16
[52] U.S. Cl. ............... 250/227.25; 250/216; 318/483
[58] Field of Search .......................... 250/227.25, 227.24, 250/216; 318/483, 480–482; 356/445, 239

[56] References Cited

U.S. PATENT DOCUMENTS 4,701,613 10/1987 Watanabe et al. ................. 250/227.24
5,015,931 5/1991 Muller ................................. 318/483
5,661,303 8/1997 Teder .............................. 250/227.25

FOREIGN PATENT DOCUMENTS

2354100 A 4/1975 Germany .
3532199 A1 3/1987 Germany .

Primary Examiner—Que Le
Attorney, Agent, or Firm—Spencer & Frank

[57] ABSTRACT

A rain sensor in which an optical effective radiation (11) is subjected to at least one total reflection in a sheet of glass (16). The effective radiation (11) coupled out of the sheet of glass (16) into a coupling-out part (22) at the end of a measuring segment (24) and possibly present interference radiation (31') impact a separating surface (25) of the coupling out part, at which surface only one of the two radiations (11, 31') is totally reflected. The separating surface (25) permits a separation of the interference radiation (31') from the effective radiation (11) before it impacts a radiation-measuring device (30). The rain sensor of the invention is particularly suited for use in motor vehicles in connection with a windshield-wiping system which is operated automatically as a function of the rain sensor.

10 Claims, 1 Drawing Sheet

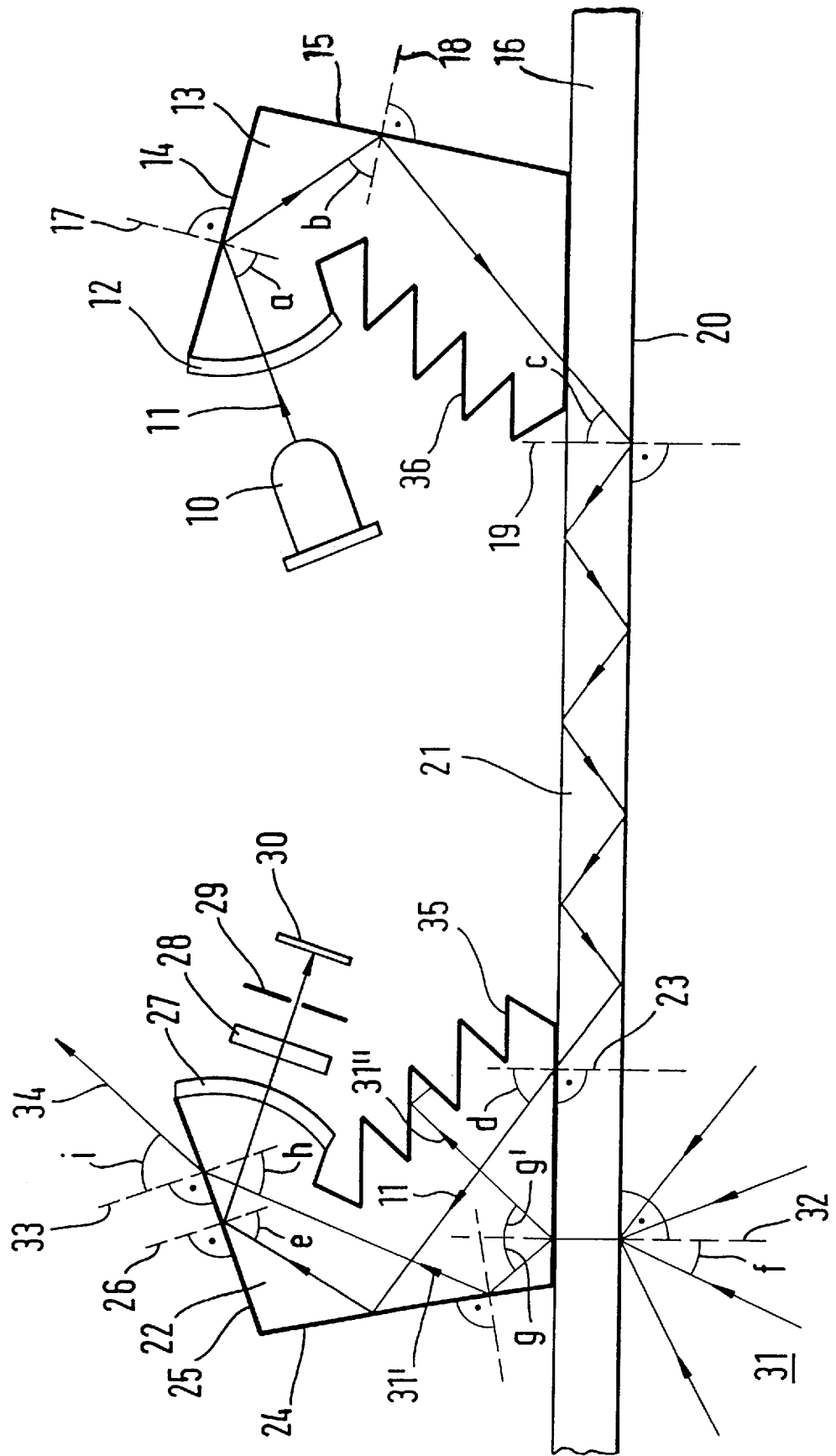

RAIN SENSOR FOR GLASS SHUT

STATE OF THE ART

The invention is based on a rain sensor in which an optical effective radiation is subjected to at least one total reflection in a sheet of glass on which the rain impinges. Disclosed in DE-PS 23 54 100 is a rain sensor of this type, which operates according to the principle of diminished total reflection. To this end the radiation emitted by a radiation source is totally reflected multiple times inside a sheet of glass on the outside and inside surface, along a measuring segment, and subsequently detected by a radiation-measuring device. Dirt particles or raindrops on the outside impair total reflection, and couple a portion of the radiation out of the sheet of glass. Each coupling-out of radiation leads to a weakening of the signal, which is detected by the radiation-measuring device. Depending on a predetermined evaluation method, for example, means for cleaning the sheet of glass are automatically activated.

In this type of rain sensor, an interfering radiation component which is emitted by the radiation source in addition to the optical effective radiation must be taken into account. An example of interfering radiation would be solar radiation, which is present particularly when the sheet of glass is disposed in a motor vehicle.

The object of the invention is to provide a rain sensor in which the influence of the interfering radiation on the result of measurement is reduced.

SUMMARY AND ADVANTAGES OF THE INVENTION

The above object generally is achieved according to the present invention by a rain sensor in which an optical effective radiation is subjected to at least one total reflection in a sheet of glass, and wherein the effective radiation coupled out of the sheet of glass at the end of a measuring segment into a coupling-out part and a present interference radiation impact at least one separating surface at which only one of the two radiations is totally reflected.

The rain sensor of the invention is equipped with a separating surface which is impacted by the effective radiation coupled out of the sheet of glass at the end of the measuring segment, as well as by an interfering radiation that may be present. The separating surface is disposed in such a manner that only one of the two radiations is totally reflected. The other radiation, in contrast, passes through the separating surface. With this measure, an effective separation of effective radiation and interfering radiation is achieved. The separation is readily possible because the effective and interfering radiations appear in different angular ranges. The effective radiation exits the sheet of glass in the region of a coupling-out part, at an angle greater than 42° with respect to a line perpendicular to the surface of the sheet of glass. Regarding the angle data, it is assumed below that the refractive index of the sheet of glass and the coupling-out part are at least approximately identical, and are approximately 1.49. The interfering radiation impacts at the region of the coupling-out part, in an angular range between 0° and 180°, which correspond to the entire half-space in front of the sheet of glass. The maximum angle of the interfering radiation in the sheet of glass and in the coupling-out part, however, is 42° with respect to a line that is perpendicular to the surface of the sheet of glass. A separation of the effective radiation from the interfering radiation is therefore always possible. The measure of using a separating surface in accordance with the invention has the advantage of a simple embodiment. The separating surface is preferably a limiting surface of the coupling-out part, which is present anyway.

Advantageous modifications and embodiments of the rain sensor of the invention are disclosed.

A particularly advantageous modification provides that both the effective radiation and the interfering radiation first impact a reflective surface after being coupled out of the sheet of glass, which surface reflects the two radiations, and that the two radiations then subsequently impact the separating surface. The advantage of the modification is that particularly the effective radiation can be diverted in an angular range that permits an advantageous arrangement od the necessary radiation-measuring device. With respect to the effective and interfering radiations, the reflective surface is disposed at an angle that leads to total reflection for both radiations. As an alternative, a reflective mirror is provided with which the angle of incidence always equals the angle of reflection.

One embodiment provides that the coupling-out part is provided with a coloring that absorbs the effective radiation slightly or not at all, while in contrast the interfering radiation is absorbed readily.

Another advantageous modification provides that the effective radiation from the coupling-out part is focussed or projected onto the radiation-measuring device with a convergent lens. Further advantageous measures that effect a reduction in the residual interfering radiation which may still be present provide the use of a filter whose wavelength is matched in the transmission band to the wavelength of the effective radiation, and the use of a screen disposed upstream of the radiation-measuring device.

One advantageous modification relates to the embodiment of an edge surface of the coupling-out part located opposite the reflective surface or separating surface. Only the interfering radiation impacts this edge surface. A step-shaped configuration of this edge surface that allows the interfering radiation impacting the edge surface to be absorbed through multiple reflections reduces the interfering radiation component, which could leave this edge surface as residual interfering radiation, for example by means of diffuse reflection. An alternative embodiment of the edge surface provides for the edge surface to be disposed in such a way that it forms an angle with the impacting interfering radiation such that no total reflection takes place. The interfering radiation component impacting the edge surface therefore leaves the coupling-out part again through this edge region.

Further advantageous modifications and embodiments of the rain sensor of the invention ensue from the detailed description below.

BRIEF DESCRIPTION OF THE DRAWING

The single FIGURE of the drawing schematically illustrates a rain sensor according to the invention.

DETAILED DESCRIPTION OF THE PREFERRED EMBODIMENT

A radiation source 10 emits an effective radiation 11, which enters coupling-in or absorption part 13 via a first convergent lens 12. The effective radiation 11 is totally reflected at a first limiting surface 14 and a second limiting surface 15, respectively, and subsequently absorbed or coupled into a sheet of glass 16. The angle of incidence a at the first limiting surface 14, which occurs between the effective radiation 11 and a first line 17 perpendicular to the limiting surface 14, and the angle b, which occurs between the effective radiation 11 and a second line 18 perpendicular to the second limiting surface 15, are preferably selected such that a total reflection takes place at the two limiting surfaces 14, 15.

The coupling-in or absorption part 13 further conducts the effective radiation 11 to the sheet of glass 16. The effective radiation 11 is absorbed in linear fashion into the sheet of glass 16 when the refractive indices of the coupling-in or absorption part 13 on the one hand and the sheet of glass 16 on the other hand coincide. It is crucial that the angle c, which occurs at a surface 20 of a sheet of glass, between a third perpendicular line 19 and the effective radiation 11, is set at a value that leads to a total reflection inside the sheet of glass 16. The angle c must be greater than, for example, 42°, with the assumption that the sheet of glass 16 has a refractive index of approximately 1.49, and is surrounded by air. As already mentioned, all angle data are based on these assumptions.

The effective radiation 11 is totally reflected at least once, preferably multiple times, in the region of a measuring segment 21 in the sheet of glass 16. A coupling-out part 22, which couples the effective radiation 11 out of the sheet of glass, is disposed at one end of the measuring segment 21. The coupling out is effected at an angle d, which occurs at the surface 20 of the sheet of glass, between a fourth perpendicular line 23 and the effective radiation 11. Provided that the refractive index of the coupling-out part 22 at least partially coincides approximately with that of the sheet of glass 16, no further angular offset takes place at the transition point. The angle d is then equal to the angle c. The angle d is greater than 42°.

The effective radiation 11 travels to a reflective surface 24, which is identical to a limiting surface of the coupling-out part 22 in the illustrated embodiment. The effective radiation 11 reflected at the reflective surface 24 travels to a separating surface 25, which is likewise preferably a limiting surface of the coupling-out part 22. At the separating surface 25, the effective radiation 11 forms an angle e with a fifth perpendicular line 26. The angle e is to be set at a value at which total reflection either does or does not occur. In the illustrated embodiment, the angle e is set at a value less than or equal to 42°, at which a total reflection of the effective radiation 11 occurs at the separating surface 25. The effective radiation 11 exits the coupling-out part 22 by way of a second convergent lens 27 and travels to a radiation-measuring device 30 by way of an optical filter 28 matched to a wavelength range, and through a screen 29.

In the region of the coupling-out part 22, an undesired interference radiation 31 can be absorbed or coupled into the coupling-out part 22 in addition to the effective radiation 11. The interference radiation 31 can essentially be incident from the entire half-space in front of the sheet of glass 16. The angle of incidence f occuring at the surface 20 of the sheet of glass, between the interference radiation 31 and a sixth perpendicular line 32, can therefore be between 0° and approximately 180°. The angular range of 0° to 180° is reduced to an angular range of 0° to 42° inside the coupling-out part 22. Of the interference radiation 31 occurring in the coupling-out part 22, only two edge beams 31', 31" are shown. With the sixth perpendicular line 32, the edge beam 31' of the interference radiation 31 forms the angle g at the surface of the sheet of glass, and the edge beam 31" forms the angle g' with the sixth perpendicular line 32. The angles g, g' are in a range of 0° to 42°, and therefore do not overlap the angle d, which is greater than or equal to 42°. A portion of the interference radiation 31 extending into the coupling-out part 22, of which only the edge beam 31' is shown, is reflected at the reflective surface 24 and subsequently reaches the separating surface 25. The angle h occurs at the separating surface 25, between the edge beam 31' of the interference radiation 31 and a seventh perpendicular line 33. It is crucial that the angle h be set as a function of the angle e. Provided that the angle e is set at a value greater than 42°, that is, total reflection of the effective radiation 11 takes place, the angle h is set at a value less than 42°, at which total reflection does not take place. Provided that the angle e is set at a value less than 42°, at which no total reflection of the effective radiation 11 takes place, the angle h is set at a value greater than 42°, at which total reflection of the interference radiation 31 takes place. The radiation 11, 31' that does not experience total reflection leaves the coupling-out part 22 at an angle i, which is greater than 42°. The angle i occurs between the seventh perpendicular line 33 and the coupled-out radiation 34. In the illustrated embodiment, the angle e, as already described, is set at an angle of less than 42°, at which total reflection occurs. The angle h is therefore set at a value greater than 42°, at which a coupling-out of the interference radiation 31 takes place, and this radiation then exits the coupling-out part 22 as coupled-out radiation 34. Under practical conditions, angles e and h cannot be set completely independently of one another. However, a large angular range can be attained through rotation of the separating surface 25 with respect to the surface 20 of the sheet of glass; in this range, the one radiation always experiences total reflection, while the other radiation is coupled out. It is to be noted that, in the illustrated embodiment, the interference radiation 31 is shown with the edge beam 31', which leads to the maximum possible angle h. With smaller angles g, the angle h is also smaller.

The reflective surface 24 permits a diversion of the two beams 11, 31 into an angular range that permits a favorable arrangement of the radiation-measuring device 30. In principle, further reflective surfaces 24, not shown in the embodiment, can be provided in place of a reflective surface 24. On the other hand, it is also possible to completely omit the reflective surface 24 shown in the embodiment. The effective radiation 11 and the interference radiation 31 then directly impact the separating surface 25. Under these circumstances, a reliable separation of the effective radiation 11 from the interference radiation 31 is also possible, because the angles e, h also essentially impact the reflective surface 24 without reflection.

A further possible measure of suppressing the interference radiation 31 in the coupling-out part 22 is to color the coupling-out part 22 in such a way that the effective radiation 11 can pass unhindered for the most part, while the wavelength ranges expected for the interference radiation 31 are absorbed. The setting of the wavelength of the effective radiation 11 emitted by the radiation source 10 in the infrared range permits a dark coloring of the coupling-out part 22 that permits a high absorption of the wavelength components of the visible radiation. The interference radiation 31 caused by the sun can therefore be effectively combatted with this measure. As an alternative or in addition to this coloring, the optical filter 28 can be provided, which has a transmission wavelength range that matches the wavelength of the effective radiation 11. A further measure relates to the arrangement of the screen 29, which permits a screening out of components of the interference radiation 31 that could not be eliminated yet, but that have at least a slight angular offset with respect to the effective radiation 11.

The special configuration of an edge surface 35 of the coupling-out part 22 located opposite the reflective surface 24 or the separating surface 25 presents another effective measure for suppressing interference radiation 31. The edge surface 35 is step-shaped in such a manner that the interference radiation 31 impacting the edge surface 35, and of which the edge beam 31" is shown, is absorbed through multiple reflections. The stepped configuration of the edge surface 35 can be characterized as an optical sink. The absorption of the interference radiation is supported by a blackening of the top of the edge surface 35. Should the coloring not be performed, a portion of the interference radiation, 31, that is, the portion that does not experience total reflection, enters the outside region through the edge surface 35. A reduction in the interference radiation is also associated with this.

One advantageous modification provides that the edge surface 36 of the coupling-in or absorption part 13, the surface being located opposite the second limiting surface 15, likewise has this stepped configuration. With this measure, it is possible on the one hand to suppress an interference radiation that can enter the region of the coupling-in or absorption part 13 and is deviated there at an angle that approximately corresponds to the angle of the effective radiation 11 during absorption into the sheet of glass 16. On the other hand, with the stepped configuration of the edge surface 36 of the absorption part 13, it is possible to produce the absorption part 13 and the coupling-out part 22 to be identical. This results in considerable savings in the creation of the shape of a plastic injected part.

A further advantage is the suppression of the reflection of an interfering radiation of the radiation source 10 at the edge surface 36.

I claim:

1. A rain sensor in which an optical effective radiation is subjected to at least one total reflection in a sheet of glass on which the rain impinges, comprising a coupling-in part for coupling the effective radiation into the sheet of glass, a coupling-out part for coupling the effective radiation out of the sheet of glass at the end of a measuring segment of the sheet of glass, with the coupling-out part having at least one separating surface on which the coupled-out effective radiation and a present interference radiation impact, with the at least one separating surface being oriented such that only one of the two radiations is totally reflected at the separating surface; and a radiation-measuring device for detecting the effective radiation coupled out of the coupling-out part after impacting said at least one separating surface.

2. A rain sensor according to claim 1, wherein the effective radiation is totally reflected at the separating surface.

3. A rain sensor according to claim 1, wherein at least one reflective surface is disposed in front of the separating surface, at which reflective surface both the effective radiation (11) and the interference radiation are reflected.

4. A rain sensor according to claim 1, wherein at least part of the coupling-out part is colored such that the effective radiation passes through substantially un-absorbed and the interference radiation is absorbed.

5. A rain sensor according to claim 1, wherein the effective radiation is coupled out of the coupling-out part via a convergent lens.

6. A rain sensor according to claim 1, wherein an optical filter that allows the passage of the effective radiation and blocks the interference radiation is disposed between the coupling-out part and the radiation-measuring device that detects the effective radiation.

7. A rain sensor according to claim 1, wherein a screen, for screening out components of the interfering radiation, is disposed between the coupling-out part and the radiation-measuring device.

8. A rain sensor according to claim 3, wherein an edge surface of the coupling-out part, which edge surface is located opposite the reflective surface or the separating surface and which is impacted by only the interference radiation, is configured in step shape such that the interference radiation impacting the edge surface is absorbed through multiple reflections on the steps of the edge surface.

9. A rain sensor according to claim 3, wherein an edge surface of the coupling-out part, which edge surface is located opposite the reflective surface (24) or the separating surface and which is only impacted by the interference radiation (31"), is disposed, with respect to the interference radiation such that no total reflection of the interference radiation takes place.

10. A rain sensor according to claim 1, wherein the coupling-in part provided for coupling the effective radiation into the sheet of glass is configured identically to the coupling-out part.

\* \* \* \* \*